United States Patent [19]

Cheng

[11] Patent Number: 4,852,420
[45] Date of Patent: Aug. 1, 1989

[54] BACKWARD DRIVING DEVICE FOR TRICYCLE

[76] Inventor: Huan-Sung Cheng, No. 222, 1-Ming Road, Ping-Tzeng Hsiang Taoyuan, Taiwan

[21] Appl. No.: 94,957

[22] Filed: Sep. 9, 1987

[51] Int. Cl.⁴ ............................................. F16H 3/14
[52] U.S. Cl. ...................................... 74/376; 74/377
[58] Field of Search ................ 74/376, 377, 342, 321

[56] References Cited

U.S. PATENT DOCUMENTS

| | | | |
|---|---|---|---|
| 1,947,847 | 2/1934 | Harvey | 74/377 X |
| 2,023,585 | 12/1935 | Harvey | 74/377 X |
| 2,299,563 | 10/1942 | Carlson et al. | 74/376 |
| 4,546,661 | 10/1985 | Weis et al. | 74/377 X |
| 4,727,768 | 3/1988 | Hayashi et al. | 74/342 X |

FOREIGN PATENT DOCUMENTS 368708 2/1939 Italy ...................................... 74/376

*Primary Examiner*—Dirk Wright
*Attorney, Agent, or Firm*—Klein & Vibber

[57] ABSTRACT

A backward driving device for tricycle, especially scooter motorcycle remodelled for the disabled, to be installed to engine power output shaft, incorporated with a shifter for driving backward.

1 Claim, 4 Drawing Sheets

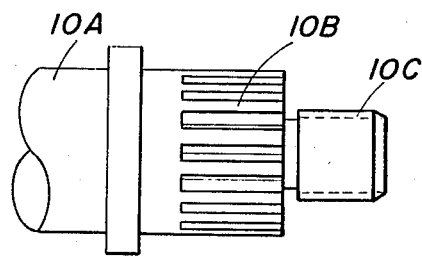
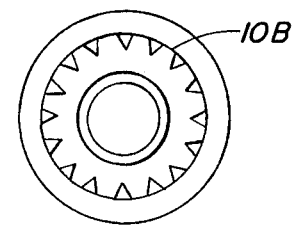
FIG. 3  FIG. 3A
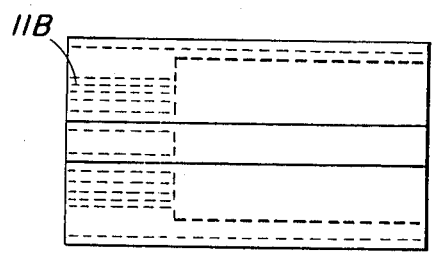
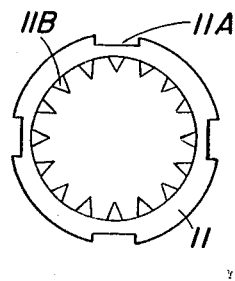
FIG. 4  FIG. 4A
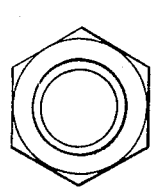
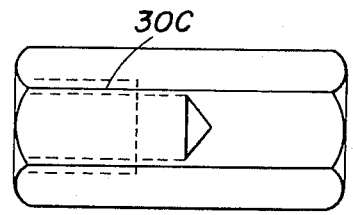
FIG. 5A  FIG. 5

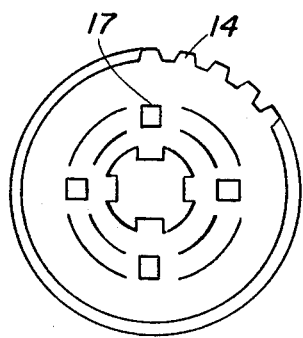 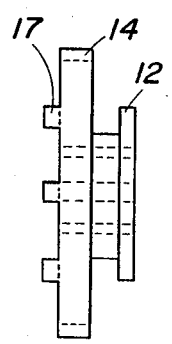 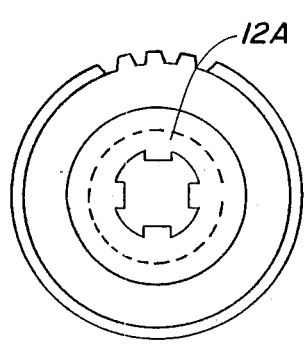
FIG. 6A     FIG. 6     FIG. 6B
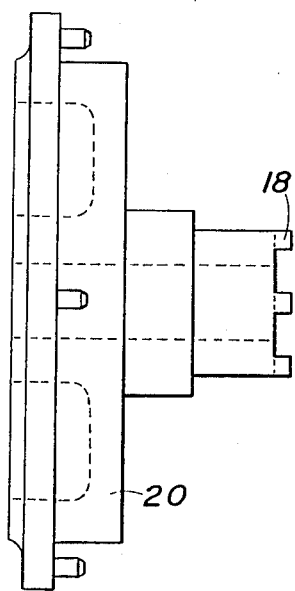 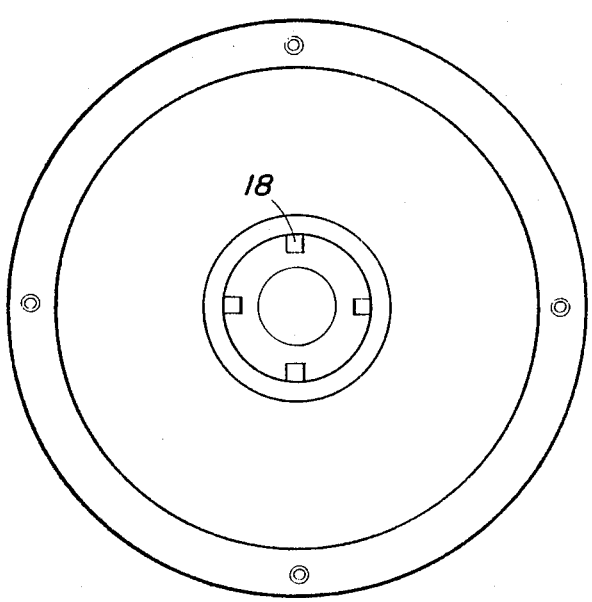
FIG. 7     FIG. 7A

BACKWARD DRIVING DEVICE FOR TRICYCLE

BACKGROUND OF THE INVENTION

Remodelled scooter for the disabled is not convenient enough for the disabled because it can't be driven backward, and this invention is a simple and low-cost measure to eliminate such a defect.

SUMMARY OF THE INVENTION

The main objective of the present invention is to provide a backward driving device for tricycle, particularly that remodelled from scooter.

The backward driving device according to the present invention is installed to engine power output shaft of scooter directly. It is incorporated with a shifter for shifting driving mode so that the scooter can be driven backward easily. Its structure is simple, and its production cost is low. It is easy to install, and it eliminate the efforts for turning a scooter backward by the disabled where backward moving is required.

BRIEF DESCRIPTION OF THE DRAWINGS

FIGS. 3 and 3A are a front view and a right side view of the main drive shaft shown in FIG. 1.

FIGS. 4 and 4A are a front view and a right side view of the power transmission shaft in FIG. 1.

FIGS. 5 and 5A are a front view and a side view of the long hexagon nut shown in FIG. 1.

FIG. 6 is a front view of the power transfer gear according to the present invention. FIG. 6A is its left side view, and FIG. 6B is its right side view.

FIGS. 7 and 7A are a front view and a side view of the brake cam according to the present invention.

DETAILED DESCRIPTION OF THE PREFERRED EMBODIMENT

Figure 1:
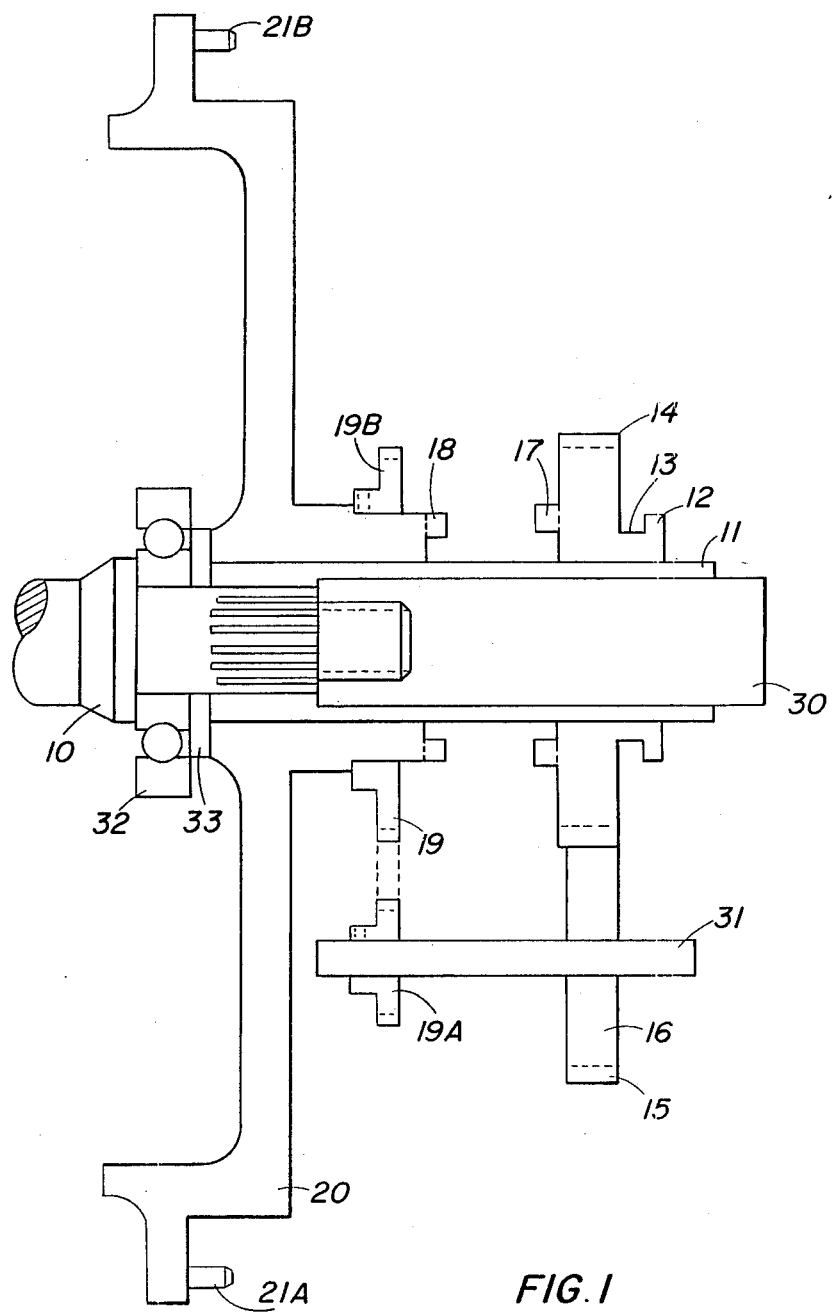
FIG. 1 illustrates the main structure of the present invention.

Please refer to FIG. 1, the major structure of the present invention mainly comprises a main drive shaft (10) which transmits power output from engine installed in a scooter, a power transmission shaft (11) fixed to the main drive shaft (10) by means of hexagon nuts (30) to transmit a power, a power transfer gear (12) with a dog clutch (17) at the left side, a shift collar (13) to shift the power transfer gear (12) leftwards, an idling gear (16), a dog clutch (18) with a wheel (20) at the left side, a chain (19), an idling sprocket (19A), a sprocket (19B) fixed to the dog clutch (18), an idling shaft (31) with both ends fixed to inner wall of the housing of the present invention and incorporated with the idling gear (16) and the idling sprocket (19A), a bearing (32) and a gasket (33) for installation of the bearing (32).

Figure 2:
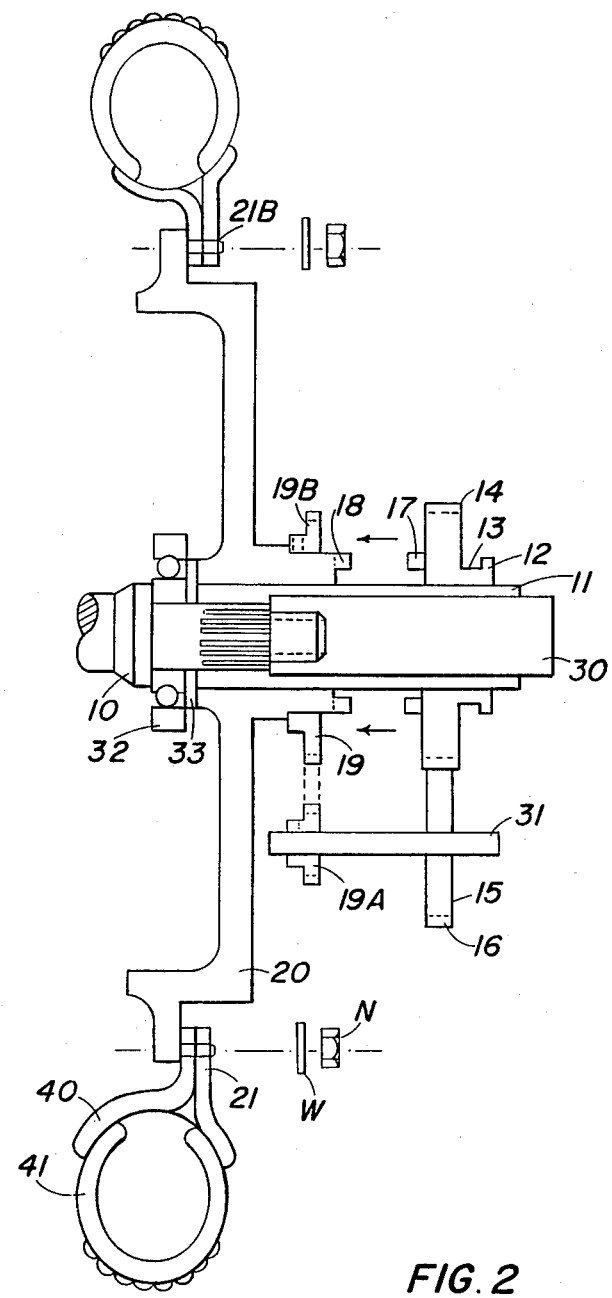
FIG. 2 illustrates installation of tires on the present invention.

Please refer to FIG. 2 for installation of tires to the present invention, in which the tires (41) each with a rim (40) are installed with nuts N with washer W between nut N and the rim (40).

When the present invention is at the condition shown in FIG. 2, engine output drives the main drive shaft (10) to rotate in the normal direction and consequently the power transmission shaft (11) runs in the normal direction. Hence, the power transfer gear (12) is driven by the slots for normal rotation, and in turn drives the idling gear to rotate in the reverse direction by a tooth (14) so that the idling shaft (31) and the idling sprocket (19A) rotate in the reverse direction. Then, the chain (19) drives the sprocket (19B) to run in reversely. Since the wheel (20) and the power transfer shaft (11) can rotate freely, the wheel (20) is driven to run in the reversely directly by the sprocket (19B) and therefore, backward movement is resulted.

For forward movement, the shift collar (13) is moved to the position shown by an arrow in FIG. 2 so that engine output is transmitted from the main drive shaft (10) to run the power transmission shaft (11) in the normal direction. With the slots (11A) the power transmission shaft (11) drives the power transfer gear (12) to run in the normal direction, consequently the wheel (20) is running in the normal direction because the dog clutch (17) is engaging with the dog clutch (18) of the wheel (20), and the present invention can move forward through the chain (19) are engaging with the sprockets (19A) and (19B) because the teeth (15) of the idling shaft (31) is not engaging with the tooth (14).

The prevent invention is an improvement over the prior art and it permits backward movement of three-wheeled scooter particularly for the disabled.

It should of course be understood that the above described embodiment of this invention is only an example, and various changes and modifications are possible within the scope of this invention.

I claim:

1. A backward driving device for reversing the rotational direction of a wheel comprising
   a drive shaft, receiving power from an engine;
   a power transmission shaft, coupled to said drive shaft;
   a power transfer gear, coaxially coupled to and slidable on said transmission shaft;
   said wheel being coaxially mounted and freely rotatable with respect to said transmission shaft and located between said drive shaft and said transfer gear;
   said transfer gear having a shift collar for sliding said transfer gear on said transmission shaft;
   said transfer gear and said wheel each having a dog clutch, respectively confronting each other such that said dog clutches are engageable and disengageable with each other by said sliding of said transfer gear on said transmission shaft whereby rotational power from said transmission shaft is directly transferred to said wheel when said dog clutches engage each other so that said wheel rotates with said transmission shaft in the same rotational direction as said transmission shaft;
   an idling shaft arranged parallel to said transmission shaft, said idling shaft having an idling gear and an idling sprocket coaxially mounted on respective ends of said idling shaft;
   said wheel being further provided with a coaxial sprocket coupled to said idling sprocket in a manner such that said wheel and said idling shaft always rotate together in the same rotational direction;
   said transfer gear being further provided with circumferential teeth for engaging said idling gear when said transfer gear is slid away from said wheel such that said dog clutches are disengaged from each other, said teeth thereby transferring rotational power from said transmission shaft to said idling shaft so that said idling shaft rotates in a direction opposite the direction of rotation of said transmission shaft; the outer periphery of the wheel being provided with a plurality of lugs for mounting a tire rim and tire.

* * * * *